(12) United States Patent
Mangeruca et al.

(10) Patent No.: US 12,087,171 B2
(45) Date of Patent: Sep. 10, 2024

(54) ASSURANCE MODULE

(71) Applicant: Rockwell Collins, Inc., Cedar Rapids, IA (US)

(72) Inventors: Leonardo Mangeruca, Rome (IT); Marco Marazza, Rome (IT); Stefano Minopoli, Rome (IT)

(73) Assignee: Rockwell Collins, Inc., Cedar Rapids, IA (US)

( * ) Notice: Subject to any disclaimer, the term of this patent is extended or adjusted under 35 U.S.C. 154(b) by 221 days.

(21) Appl. No.: 17/231,401

(22) Filed: Apr. 15, 2021

(65) Prior Publication Data

US 2022/0020277 A1 Jan. 20, 2022

(30) Foreign Application Priority Data

Jul. 15, 2020 (EP) .................................. 20425027

(51) Int. Cl.
*G08G 5/00* (2006.01)

(52) U.S. Cl.
CPC ......... *G08G 5/0039* (2013.01); *G08G 5/0034* (2013.01); *B64U 2201/10* (2023.01); *G08G 5/0091* (2013.01)

(58) Field of Classification Search
CPC .. G08G 5/0039; G08G 5/0013; G08G 5/0034; G08G 5/0069; G08G 5/0021;
(Continued)

(56) References Cited

U.S. PATENT DOCUMENTS 6,421,603 B1 7/2002 Pratt et al.
8,600,602 B1 12/2013 McAndrew et al.
(Continued)

FOREIGN PATENT DOCUMENTS

EP 1857904 A1 11/2007
EP 3459850 A1 3/2019
(Continued)

OTHER PUBLICATIONS

FR-3067804-A1, English Translation, (Year: 2018).*
(Continued)

*Primary Examiner* — Amelia Vorce
(74) *Attorney, Agent, or Firm* — Kinney & Lange, P.A.

(57) ABSTRACT

A run-time assurance module (6) comprises a contingency planner (26) arranged to generate an initial contingency plan having an associated safety-critical decision point, where the initial contingency plan (ICP) is stored as a current contingency plan in a memory (30). The assurance module (6) receives a mission plan (MP) from a mission planner (4). When the mission plan (MP) is being carried out, the contingency planner (26) processes at least one condition input, and generates a new contingency plan (NCP) based on the condition input. When the new contingency plan (NCP) satisfies a safety criterion and the safety-critical decision point associated with the new contingency plan (NCP) will occur later in time than the safety-critical decision point associated with the current contingency plan (CCP), the new contingency plan (NCP) is stored in the memory (30) as the current contingency plan (CCP).

15 Claims, 5 Drawing Sheets

(58) Field of Classification Search
CPC .. G08G 5/0052; G08G 5/0091; B64C 39/024; B64U 2101/00; G06Q 10/08
See application file for complete search history.

(56) References Cited

U.S. PATENT DOCUMENTS

| | | | |
|---|---|---|---|
| 8,798,922 B2 | 8/2014 | Tillotson et al. | |
| 8,843,303 B1* | 9/2014 | Young | G08G 5/006 701/122 |
| 9,946,258 B2 | 4/2018 | Kwan | |
| 10,001,776 B2 | 6/2018 | Rangarajan | |
| 10,459,446 B2 | 10/2019 | Nishi | |
| 10,502,584 B1 | 12/2019 | Suiter et al. | |
| 10,607,495 B2 | 3/2020 | Lohmiller et al. | |
| 10,964,220 B2* | 3/2021 | Heiberg | G08G 5/0013 |
| 2005/0075763 A1 | 4/2005 | Brigode | |
| 2005/0261808 A1* | 11/2005 | Artini | |
| 2006/0106506 A1* | 5/2006 | Nichols | G05D 1/106 701/3 |
| 2011/0035149 A1* | 2/2011 | McAndrew | G08G 5/006 701/466 |
| 2013/0311009 A1 | 11/2013 | McAndrew et al. | |
| 2014/0142787 A1* | 5/2014 | Tillotson | H04K 3/224 701/3 |
| 2015/0323931 A1* | 11/2015 | Downey | G08G 5/0069 701/2 |
| 2016/0054737 A1* | 2/2016 | Soll | H04N 23/695 701/3 |
| 2016/0140851 A1 | 5/2016 | Levy et al. | |
| 2016/0357192 A1* | 12/2016 | McGrew | B64U 10/25 |
| 2017/0154535 A1 | 6/2017 | Downey et al. | |
| 2017/0269611 A1 | 9/2017 | Rangarajan | |
| 2017/0337824 A1* | 11/2017 | Chen | B64C 39/024 |
| 2018/0004207 A1 | 1/2018 | Michini et al. | |
| 2018/0005533 A1 | 1/2018 | Lohmiller et al. | |
| 2018/0017967 A1 | 1/2018 | Kwan | |
| 2018/0032079 A1 | 2/2018 | Nishi | |
| 2018/0096609 A1* | 4/2018 | de la Cruz | G08G 5/0043 |
| 2018/0157255 A1 | 6/2018 | Halverson et al. | |
| 2018/0233053 A1 | 8/2018 | Blomberg et al. | |
| 2019/0033862 A1* | 1/2019 | Groden | G08G 5/0086 |
| 2019/0355261 A1 | 11/2019 | Blomberg et al. | |
| 2020/0027358 A1 | 1/2020 | Fine | |
| 2020/0103901 A1 | 4/2020 | Groden et al. | |
| 2020/0193844 A1 | 6/2020 | Mahkonen et al. | |
| 2021/0263537 A1* | 8/2021 | Belt | G08G 5/025 |
| 2022/0238025 A1* | 7/2022 | McCann | G08G 5/0039 |

FOREIGN PATENT DOCUMENTS

| | | |
|---|---|---|
| FR | 3067804 A1 * | 12/2018 |
| JP | 2018077760 A * | 5/2018 |
| WO | 2017127596 A1 | 7/2017 |

OTHER PUBLICATIONS

JP-2018077760-A, English Translation, (Year: 2018).*
DiFelici et al., "UAS Safety Planning and Contingency Assessment and Advisory Reseach", 978-1-5090-2149-9/16/$31.00 @ 2016 IEEE (Year: 2016).*
1 European Search Report for European Patent Application No. 20425027.8, dated Sep. 25, 2020, 7 pages.
Standard Practice for Methods to Safely Bound Flight Behavior of Unmanned Aircraft Systems Containing Complex Functions, ASTM F3269-17, https://www.astm.org/f3269-17.html, last updated Nov. 19, 2021.
Pek, Christian, et al., An Online Verification Framework for Motion Planning of Self-driving Vehicles with Safety Guarantees (AAET Conference, 2019).

* cited by examiner

ASSURANCE MODULE

TECHNICAL FIELD

This disclosure relates to an assurance module for autonomous systems in aerospace applications, and in particular to a 'run-time' assurance module suitable for dynamic contexts.

BACKGROUND ART

Autonomous systems have the potential of increasing performance and safety across a wide range of application domains, including aerospace applications, such as unmanned aerial vehicles (UAVs) and single pilot operations (SPO). Among the key characteristics that make autonomous systems successful are the ability to find optima in huge solution spaces under multiple constraints and to learn from experience in the form of a given amount of data.

However, these characteristics raise the level of complexity of the algorithms employed to the point that traditional offline verification methods struggle to increase confidence in these systems, hindering the ability to certify them at the appropriate assurance level.

In order to accelerate the introduction of autonomous functions in safety-critical applications, the ASTM-F3269-17 standard proposes a 'Run-Time Assurance' architecture, in which a safety monitor checks the aircraft behaviour against pre-defined safety limits and engages a recovery control function in case of possible violations.

A significant limitation of conventional approaches is that such approaches require the pre-defined limits and recovery control response time to be known at the time of the operational risk assessment. This makes it impossible to apply this concept in more dynamic contexts, such as mission planning or for online flight trajectory planning for avoidance of dynamically evolving hazards, including adverse weather conditions.

SUMMARY OF THE DISCLOSURE

In accordance with a first aspect, the present disclosure provides a run-time assurance module comprising:
   a contingency planner arranged to generate an initial contingency plan having an associated safety-critical decision point, wherein said initial contingency plan is stored as a current contingency plan in a memory;
   said assurance module being arranged such that:
   the assurance module receives a mission plan from a mission planner;
   when the mission plan is being carried out, the contingency planner processes at least one condition input, and generates a new contingency plan based on said condition input, said new contingency plan having an associated safety-critical decision point; and
   when the new contingency plan satisfies a safety criterion and the safety-critical decision point associated with the new contingency plan will occur later in time than the safety-critical decision point associated with the current contingency plan, the new contingency plan is stored in the memory, wherein the assurance module is arranged to select the new contingency plan as the current contingency plan.

This first aspect of the disclosure extends to a system comprising the run-time assurance module and the mission planner. Thus, the first aspect of the present disclosure extends to a monitored mission planning system comprising a mission planner arranged to generate a mission plan, and a run-time assurance module, wherein the run-time assurance module comprises:
   a contingency planner arranged to generate an initial contingency plan having an associated safety-critical decision point, wherein said initial contingency plan is stored as a current contingency plan in a memory;
   said assurance module being arranged such that:
   when the mission plan is being carried out, the contingency planner processes at least one condition input, and generates a new contingency plan based on said condition input, said new contingency plan having an associated safety-critical decision point; and
   when the new contingency plan satisfies a safety criterion and the safety-critical decision point associated with the new contingency plan will occur later in time than the safety-critical decision point associated with the current contingency plan, the new contingency plan is stored in the memory, wherein the assurance module is arranged to select the new contingency plan as the current contingency plan.

The first aspect of the disclosure also extends to an aircraft comprising the run-time assurance module and the mission planner. Thus, the first aspect of the present disclosure extends to an aircraft comprising a mission planner arranged to generate a mission plan, and a run-time assurance module, wherein the run-time assurance module comprises:
   a contingency planner arranged to generate an initial contingency plan having an associated safety-critical decision point, wherein said initial contingency plan is stored as a current contingency plan in a memory;
   said assurance module being arranged such that:
   when the mission plan is being carried out, the contingency planner processes at least one condition input, and generates a new contingency plan based on said condition input, said new contingency plan having an associated safety-critical decision point; and
   when the new contingency plan satisfies a safety criterion and the safety-critical decision point associated with the new contingency plan will occur later in time than the safety-critical decision point associated with the current contingency plan, the new contingency plan is stored in the memory, wherein the assurance module is arranged to select the new contingency plan as the current contingency plan;
   wherein the aircraft further comprises a vehicle management system arranged to receive the mission plan and the current contingency plan, to carry out the mission plan in a normal mode, and to carry out the current contingency plan in a recovery mode.

It will be appreciated that the term 'aircraft' as used herein extends to any fixed wing or rotary wing vehicle capable of flight, whether manned or unmanned. This extends to unmanned aerial vehicles (UAVs) or 'drones'.

This first aspect of the disclosure also extends to a method of mission planning for an aerospace application, the method comprising:
   generating or receiving a mission plan;
   generating an initial contingency plan having an associated safety-critical decision point;
   storing the initial contingency plan as a current contingency plan in a memory;
   carrying out the mission plan;
   when the mission plan is being carried out, processing at least one condition input, and generating a new contingency plan based on said condition input, said new contingency plan having an associated safety-critical decision point;

when the new contingency plan satisfies a safety criterion and the safety-critical decision point associated with the new contingency plan will occur later in time than the safety-critical decision point associated with the current contingency plan, storing the new contingency plan; and selecting the new contingency plan as the current contingency plan.

The first aspect of the disclosure additionally extends to a non-transitory computer-readable medium comprising instructions that, when executed by a processor, cause the processor to carry out a method of mission planning for an aerospace application, the method comprising:

generating or receiving a mission plan;

generating an initial contingency plan having an associated safety-critical decision point;

storing the initial contingency plan as a current contingency plan in a memory;

carrying out the mission plan;

when the mission plan is being carried out, processing at least one condition input, and generating a new contingency plan based on said condition input, said new contingency plan having an associated safety-critical decision point; and when the new contingency plan satisfies a safety criterion and the safety-critical decision point associated with the new contingency plan will occur later in time than the safety-critical decision point associated with the current contingency plan, storing the new contingency plan; and selecting the new contingency plan as the current contingency plan.

Furthermore, the first aspect of the disclosure extends to a computer software product comprising instructions that, when executed by a processor, cause the processor to carry out a method of mission planning for an aerospace application, the method comprising:

generating or receiving a mission plan;

generating an initial contingency plan having an associated safety-critical decision point;

storing the initial contingency plan as a current contingency plan in a memory;

carrying out the mission plan;

when the mission plan is being carried out, processing at least one condition input, and generating a new contingency plan based on said condition input, said new contingency plan having an associated safety-critical decision point; and when the new contingency plan satisfies a safety criterion and the safety-critical decision point associated with the new contingency plan will occur later in time than the safety-critical decision point associated with the current contingency plan, storing the new contingency plan; and selecting the new contingency plan as the current contingency plan.

Thus, it will be appreciated that examples of the present disclosure provide a 'run-time assurance module' that allows the contingency plan to be updated during run-time, i.e. while the mission plan is being carried out. Information received during normal operation is used to generate new contingency plans, which can overwrite earlier contingency plan(s), or be stored alongside earlier contingency plans where at least one new contingency plan is marked as the 'current' contingency plan, either immediately or at a later point in time, as outlined in further detail below. As outlined below in respect of certain examples of the present disclosure, there may be multiple newly generated contingency plans that meet the requirements to supersede the current contingency plan, and these may be assessed as outlined hereinbelow.

It will be appreciated that the 'safety-critical decision point' associated with each contingency plan is the last point in time that the contingency plan can be carried out. The newly generated contingency plan is verified to ensure that it is safe and, if so, it can replace the earlier contingency plan assuming that its safety-critical decision point will occur further in the future along the mission plan than the equivalent point in time for the existing contingency plan.

Selecting the new contingency plan as the current contingency plan may be done immediately, such that once a new contingency plan is elaborated that is deemed safe and has a safety-critical decision point that occurs later than that of the current contingency plan, the new plan immediately replaces the current one. However, in some examples, the new contingency plan is selected as the current contingency plan only once the safety-critical decision point of the current contingency plan is reached. In other words, the 'previous' current contingency plan remains as the 'current' plan up until the aircraft reaches the associated safety-critical decision point, at which time it is replaced with the new contingency plan.

Typically, the 'safety-critical decision point' associated with each contingency plan is generated together with the contingency plan or is selected from a set of pre-generated decision points along the mission plan.

An assurance module in accordance with examples of the present disclosure may advantageously enable the deployment of autonomous functions in safety-critical aerospace applications, increasing performance and safety of the aircraft. The assurance module of the present disclosure may also be suitable for resilient autopilot in single pilot operations (SPO) applications and for unmanned aerial vehicles (UAVs).

Unlike prior art arrangements, known in the art per se, that consider only fixed safety constraints, the assurance module of the present disclosure considers dynamic constraints. Furthermore, the assurance module of the present disclosure verifies contingency plans at run-time, e.g. against adverse weather threats. Thus, the approach disclosed herein can accommodate variable safety limits and bounds, unknown detectable hazards (i.e. that were not known prior to commencement of the mission), and/or widely variable hazard response delays.

It will be appreciated that a mission plan typically comprises a mission target location and a mission flight path. The flight path may be used by the aircraft to navigate to the target location. Similarly, the contingency plans may each comprise a respective contingency target location and a contingency flight path. The contingency target location may be a different location to the mission target location, e.g. the mission target location may be a particular airport, and the contingency target location may be an alternate airport. Similarly, the contingency flight path may be different from the mission flight path, e.g. to a different target location. Scenarios are envisioned in which a particular contingency plan has the mission target location as the contingency target location, but with a different flight plan (e.g. a safer but longer path that avoids a turbulent weather zone). Similarly, multiple contingency plans may be assessed having the same contingency target location, but different contingency flight paths. Additionally, or alternatively, newly generated contingency plans may have the remaining portion of the original flight plan (i.e. of the mission plan) as the contingency plan if deemed safe, as outlined below.

The target locations are geographic destinations of the aircraft, which may be provided in a suitable spatial coordinate system, e.g. longitude, latitude, and altitude. The flight paths may include a number of waypoint locations that the aircraft is to fly through in order. The flight path may include expected timestamps associated with each of the waypoints, these timestamps corresponding to when the aircraft is expected to fly through the associated waypoints. Some degree of tolerance would typically be applied to the waypoints and/or timestamps to accommodate slight variations in flight trajectory and speed.

The safety-critical decision points associated with the mission and contingency plans may be spatial locations and/or timestamps. If a safety-critical decision point is reached and there is no further safe contingency plan, the system may engage an autopilot function such that the current contingency plan is executed.

In order to be stored as the current contingency plan (or within a library of such contingency plans as per a particular set of examples) the safety criterion must be met by a newly generated contingency plan. In some examples, the new contingency plan may have to satisfy a plurality of safety criteria. The safety criterion or criteria may include dynamic (i.e. time-varying) and/or predetermined (i.e. pre-defined) safety limits, e.g. relating to maximum or minimum tolerable values for certain parameters and/or probabilities of a hazard or issue causing a significant problem or catastrophic failure. This safety monitor ensures that any and all contingency plans that may be carried out meet the necessary safety requirements.

The safety requirements may include, but are not necessarily limited to checking that:

1) The spatial and temporal distance between the flight plan and the hazards is above a safety threshold;
2) The risk that such distance is violated is below a given threshold;
3) The fuel availability is sufficient to enable completion of the flight plan and arrive safely at the target location; and/or
4) The flight plan is feasible (i.e. flyable by the aircraft).

An assessment regarding whether a particular contingency plan meets the safety criterion or criteria may be made by a safety monitor arranged to receive the new contingency plan from the contingency planner. The safety monitor may be included within the assurance module, i.e. as part of the same hardware and/or software solution. Such a safety monitor may also receive the at least one condition input and use said condition input(s) when determining whether the contingency plan being assessed meets the safety requirements, i.e. that it satisfies the safety criterion or criteria. The safety monitor may also receive the mission plan from the mission planner and may, in some examples, verify that the mission plan meets the safety criterion or criteria. Thus, the safety monitor may also be used, e.g. prior to the start of the mission or while carrying out the 'main' mission plan, to ensure that the 'main' mission plan or the remaining part thereof also meets the safety requirements.

Scenarios are envisaged in which the remaining mission plan may be deemed the safest option, such that the mission plan may be selected as the current contingency plan. Generally, for safety, it is preferred that there is a contingency plan that is assured to be safe for as much of the mission as possible, however at late stages of the mission, it may be that the safest (or only) option is to complete the mission plan.

The assurance module may also, at least in some examples, check to ensure the flight plan associated with the new contingency plan is actually feasible (i.e. flyable). In other words, the assurance module may check to ensure that the aircraft can carry out the appropriate manoeuvres, e.g. ensure that there are no required turns that are too tight, no requirement for too steep a descent etc. This assessment may be carried out by the safety monitor, by a separate, dedicated module, and/or by another, multipurpose device on the aircraft such as a VMS (sometimes referred to as a flight management system or 'FMS', where these terms are used interchangeably in this disclosure). If the new contingency plan is not determined to be flyable, it may not be stored as the current contingency plan.

In a set of examples, the assurance module is arranged to generate a plurality of contingency plans for the condition input and to store said plurality of contingency plans in the memory as a contingency plan library, wherein each of said contingency plans has an associated safety-critical decision point. The assurance module may select one of the contingency plans in the library as the current contingency plan (e.g. immediately or when the safety-critical decision point of the current contingency plan is reached), and this selection may change in accordance with prevailing conditions or needs. For example, when the new contingency plans are generated for a given condition input, each of these may have different considerations, for example different landing points, flight distances, time of flight, predicted fuel consumption, wind conditions, operating costs, etc., where these factors may influence the decision as to which of the plans is the most appropriate contingency plan for a given scenario.

In some examples, the assurance module comprises a switch arranged to switch an output plan between the mission plan and the current contingency plan. The output plan may be provided to a vehicle management system (VMS). Those skilled in the art will appreciate that a VMS is a component provided in some aerospace applications (e.g. on some aircraft) that may handle functions such as: sensing the aircraft's position, velocity, speed, acceleration, attitude, rate, heading, and altitude; generating commands (e.g. to follow the mission flight path or contingency flight path as appropriate); and controlling aircraft actuators to carry out such commands.

There are a number of different sources that may provide the at least one condition input. For example, the assurance module may be arranged to receive a condition input from at least one sensor. One or more such sensor(s) may, in some examples, comprise an on-board weather sensor, e.g. an on-board weather radar. Such an on-board weather sensor may determine prevailing weather conditions near the aircraft, where the output(s) of the sensor(s) is provided as the condition input. If turbulent weather is detected, this may be used to determine the new contingency plan, e.g. to plan a contingency route that avoids the detected turbulent weather.

Other sensors that may be used to provide a condition input include but are not limited to temperature sensors, humidity sensors, pressure sensors, speed sensors, proximity sensors, or inertial measurement sensors such as accelerometers and/or gyroscopes. Such sensors may provide information regarding the condition of the aircraft and/or the local environment (e.g. the airspace around the aircraft) that may be used when generating possible contingency plans and/or assessing whether such plans meet the safety criterion. Additionally, or alternatively, one or more sensors may be used for estimating the aircraft position and/or assessing when the aircraft will reach the current safety-critical decision point.

The at least one condition input may, additionally or alternatively, be provided by a communications module. The aircraft may, using such a communications module, receive safety-critical information, e.g. hazard and environmental information, including but not limited to weather information, from the ground or from other aircraft such as those further along the route of the mission plan. The communications module may, in some examples, form part of the run-time assurance module, or it may be a separate module.

It will be appreciated that 'weather information' may comprise information relating to rain, snow, hail, ice, wind, turbulence, storm, or any other weather condition or combination of such conditions that may impact the flight.

Additionally, or alternatively, in some examples the at least one condition input is provided by a vehicle management system (VMS). In a set of examples in which a VMS (which may support some or all of the preceding functions of a VMS described herein) is provided, such a VMS may be arranged to provide at least one condition input to the assurance module. If the VMS were, for example, to become aware of prevailing conditions or faults that may impact the contingency plans, these can be provided as an input to the assurance module, which can dynamically plan accordingly.

The source of the condition input (e.g. a sensor or communications component) may be connected to the assurance module directly, or the condition input may be provided indirectly, e.g. via another component such as the VMS/FMS. The condition input(s) may, in some examples, be provided to an input manager.

The new contingency plan may 'overwrite' the previous current contingency plan, however in some examples each contingency plan is retained even when superseded, wherein the 'current' contingency plan is denoted with a suitable flag or marker upon its selection. Such arrangements may allow for reversion to a previous contingency plan (providing its safety-critical decision point has not already passed) if it is later deemed more appropriate and/or more convenient from the safety, performance and cost perspectives due to a change in conditions. To said purpose, the available contingency plans may be ordered by an appropriate ranking function.

The memory may be embodied within a switching unit comprising the memory. This switching unit may carry out the operation of switching between the various contingency plans to select one of them as the current contingency plan suitable for output from the assurance module, e.g. to a VMS or other external component as appropriate.

In some examples, the memory may be provided with appropriate memory management logic, either within the memory or as part of a separate module. The memory management logic may attend to memory management functions including but not limited to removing old contingency plans and/or removing invalid contingency plans, e.g. to free up memory space.

It will be appreciated that any and all of the optional features described herein with respect to examples of the present disclosure may be combined in any suitable combination as appropriate.

BRIEF DESCRIPTION OF THE DRAWINGS

Certain examples of the present disclosure will now be described with reference to the accompanying drawings, in which.

DETAILED DESCRIPTION

Figure 1:
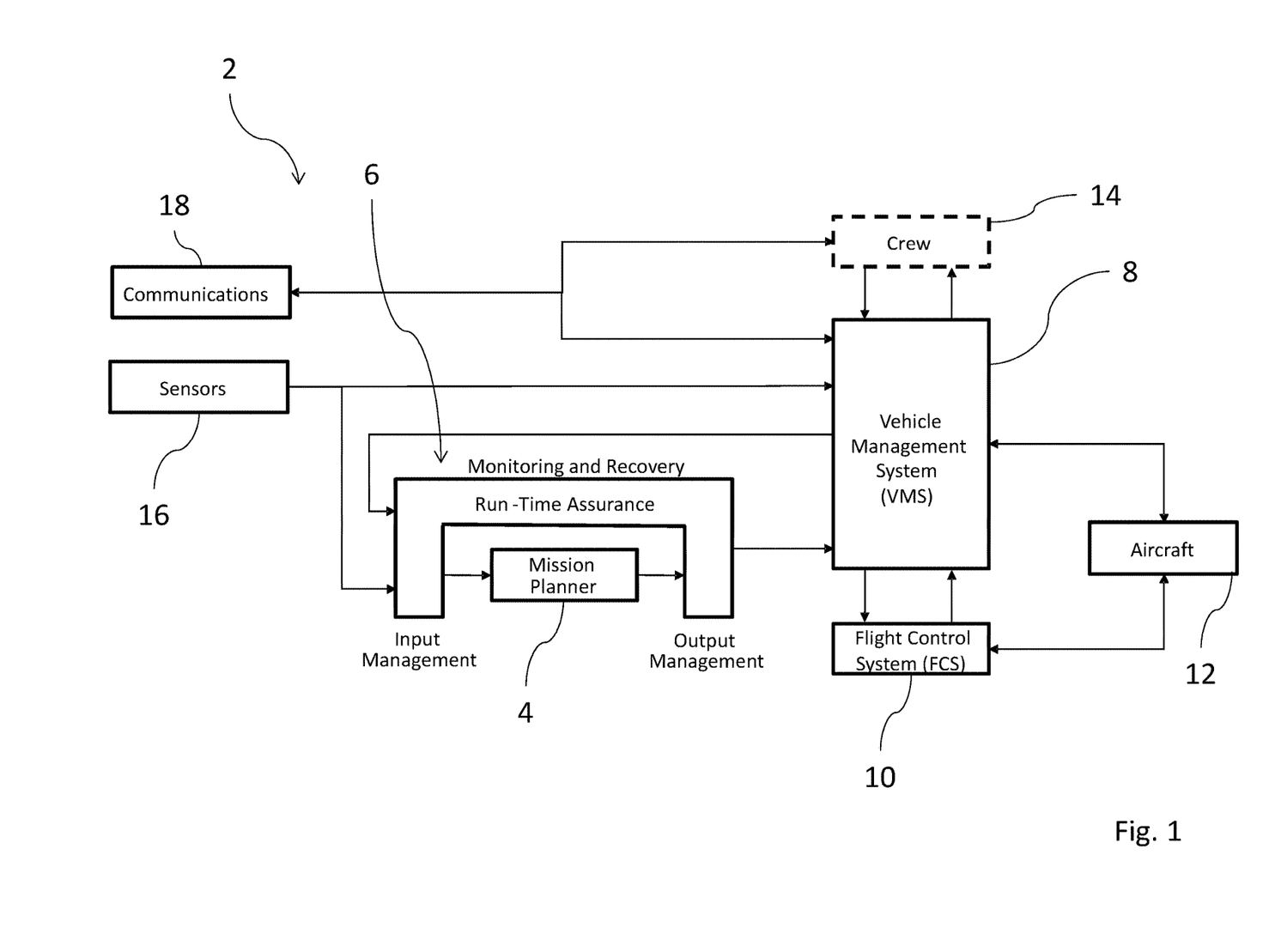
FIG. 1 is a block diagram of an aerospace system including a run-time assurance module in accordance with an example of the present disclosure.

FIG. 1 is a block diagram of an aerospace system 2 including a mission planner 4 and a run-time assurance (RTA) module 6, in accordance with an example of the present disclosure. It will be appreciated that the system 2 shown in FIG. 1 is simplified for ease of illustration and description, and a practical 'real-life' system may include other components not shown, and the topology may vary. However, the general principles of the system 2 are described conceptually here for context.

The mission planner 4 and RTA module 6 provide plans to a vehicle management system (VMS) 8. The VMS 8 may also be referred to as a flight management system (FMS). This VMS 8 communicates with the flight control system (FCS) 10 which, in turn, drives motion of the aircraft 12, e.g. by controlling the various actuators of the aircraft 12 in order to carry out the flight plan. The VMS 8 monitors operation of the aircraft 12 and receives feedback from the FCS 10. The VMS 8 also supplies information to, and receives information from, the crew 14 in a manner known in the art per se.

Sensors 16 supply information to the RTA module 6 and to the VMS 8, where this information relates to the condition of the aircraft 12 and/or the local environment, e.g. the airspace around the aircraft 12. These sensors 16 may include on-board weather sensors (e.g. an on-board weather radar) which determine prevailing weather conditions near the aircraft 12. Other sensors 16 that may be provided, depending on the application, include: temperature sensors, humidity sensors, pressure sensors, speed sensors, proximity sensors, or inertial measurement sensors such as accelerometers and/or gyroscopes. It will of course be appreciated that other types of sensors not explicitly listed may also be used where their output may be useful for generating contingency plans and/or assessing the safety of some or all mission and/or contingency plans as appropriate.

The system 2 also includes a communications module 18, which may transmit signals to, and receive signals from, e.g. the ground (such as air traffic control) and/or other aircraft. These signals may be data that is exchanged with the flight management system, and/or may be communications channels for use by the crew 14, e.g. for verbal communication. These communications may be relayed to the RTA module 6 by the VMS 8. The VMS 8 may also supply operational data to the RTA module 6.

Conventional RTA modules, such as the RTA module proposed in the ASTM-F3269-17 standard utilise a safety monitor that checks the aircraft behaviour against predefined safety limits and engages a recovery control function in case of possible violations. The recovery control function in such cases is a pre-programmed response to a static set of conditions. As explained earlier, a significant limitation of such prior art approaches is that this requires the pre-defined limits and recovery control response time to be known at the time of the operational risk assessment. This makes it impossible to apply this concept in more dynamic contexts, such as mission planning or for online flight trajectory planning for avoidance of adverse weather conditions.

Figure 2:
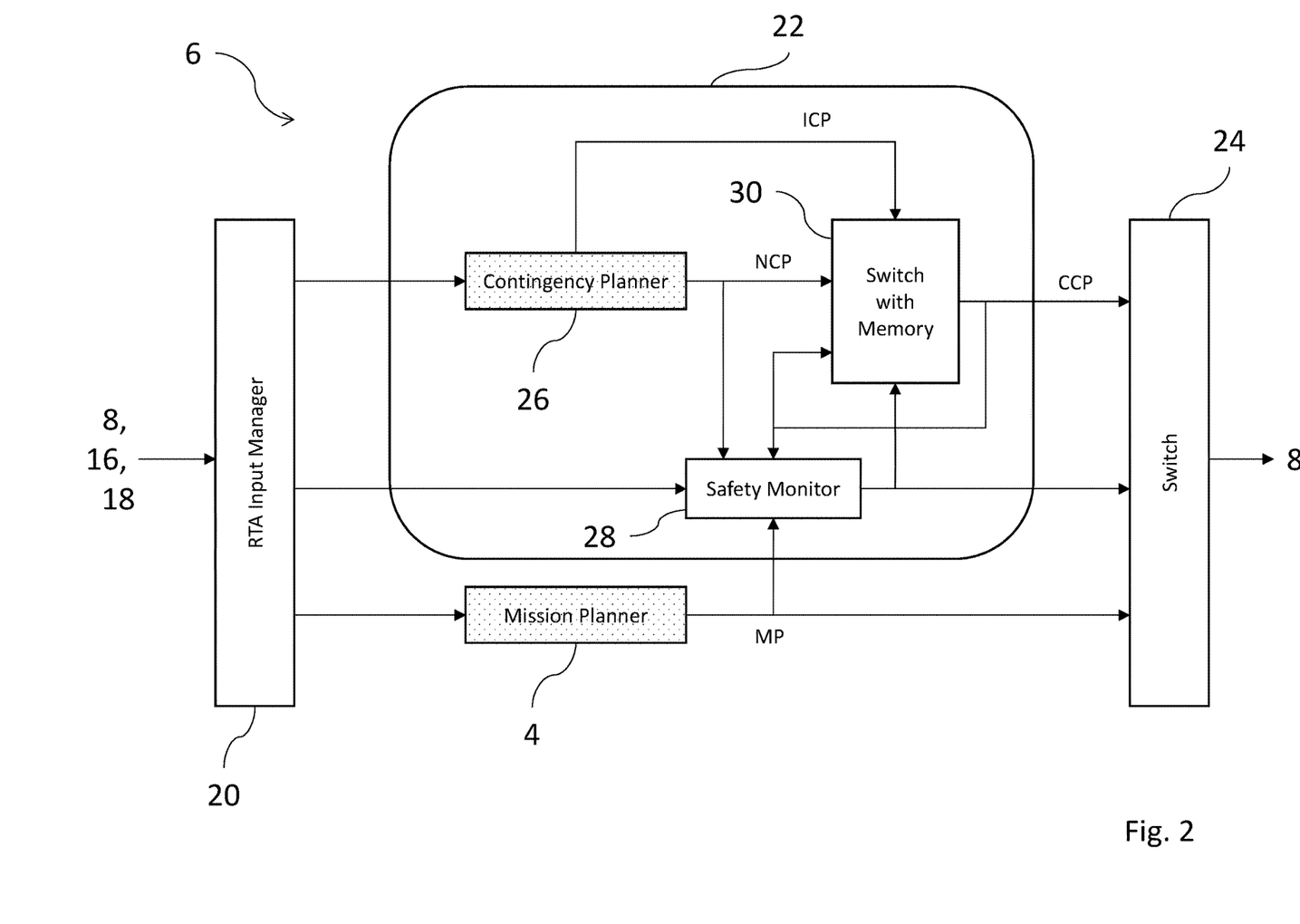
FIG. 2 is a block diagram of the run-time assurance module for use in the system of FIG. 1.

In order to overcome the limitations of the ASTM approach outlined previously, examples of the present disclosure employ an improved architecture for the run-time assurance (RTA) module, an example of which is shown in the block diagram of FIG. 2. Exemplary operation of the RTA module 6 is described with reference to the schematic diagram of FIG. 3, which illustrates how the RTA module 6 dynamically adjusts for adverse weather conditions at runtime, i.e. while the mission plan is being carried out.

The RTA module 6 includes an input manager 20, a safety manager 22, and a switch 24, the functions of which are described in more detail below. Also shown in FIG. 2 is the mission planner 4, which may be separate to the RTA module 6, i.e. it may form a wholly separate hardware device or software function that may be carried out on a separate computer to the functions of the RTA module 6.

The input manager 20 receives inputs from the VMS 8, sensors 16, and communications module 18 as discussed above. Of particular interest in this example is that the output of the weather radar, i.e. one of the sensors 16, is provided to the RTA module 6 via the input manager 20. If hazardous weather is detected, as described with respect to FIG. 3 below, the input from the weather radar is used to determine a new contingency plan.

The safety manager 22 includes a contingency planner 26, a safety monitor 28, a switch with memory 30. The function of these elements is described in further detail below, alongside the example shown in FIG. 3. The general operational process of the RTA module 6 can be understood with reference to the flowcharts of FIGS. 4 and 5.

As can be seen in FIG. 2, the mission planner 4 and contingency planner 26 are 'non-pedigreed' components (illustrated by the shaded boxes in FIG. 2), in that their assurance level may not be directly ensured due to the complex functions that they carry out. However, the other components of the RTA module 6 are 'pedigreed', in that their assurance level can be ensured and determined to meet required standards. However, because the safety of the plans generated by the mission planner 4 and contingency planner 26 is verified by the safety monitor 28, the safety of the system overall is assured.

Figure 3:
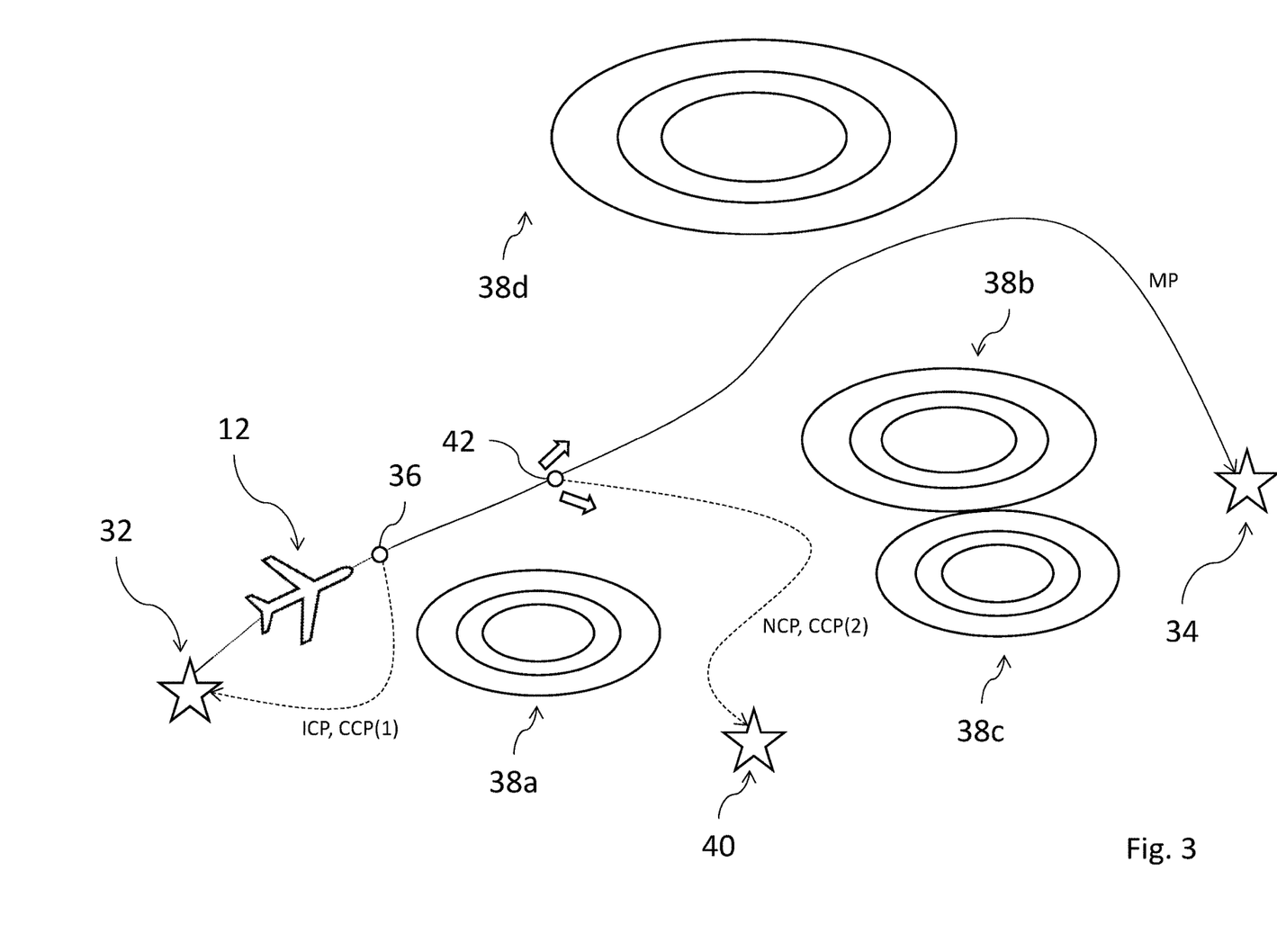
FIG. 3 is a schematic diagram illustrating run-time operation of the assurance module of FIG. 2.
Figure 4:
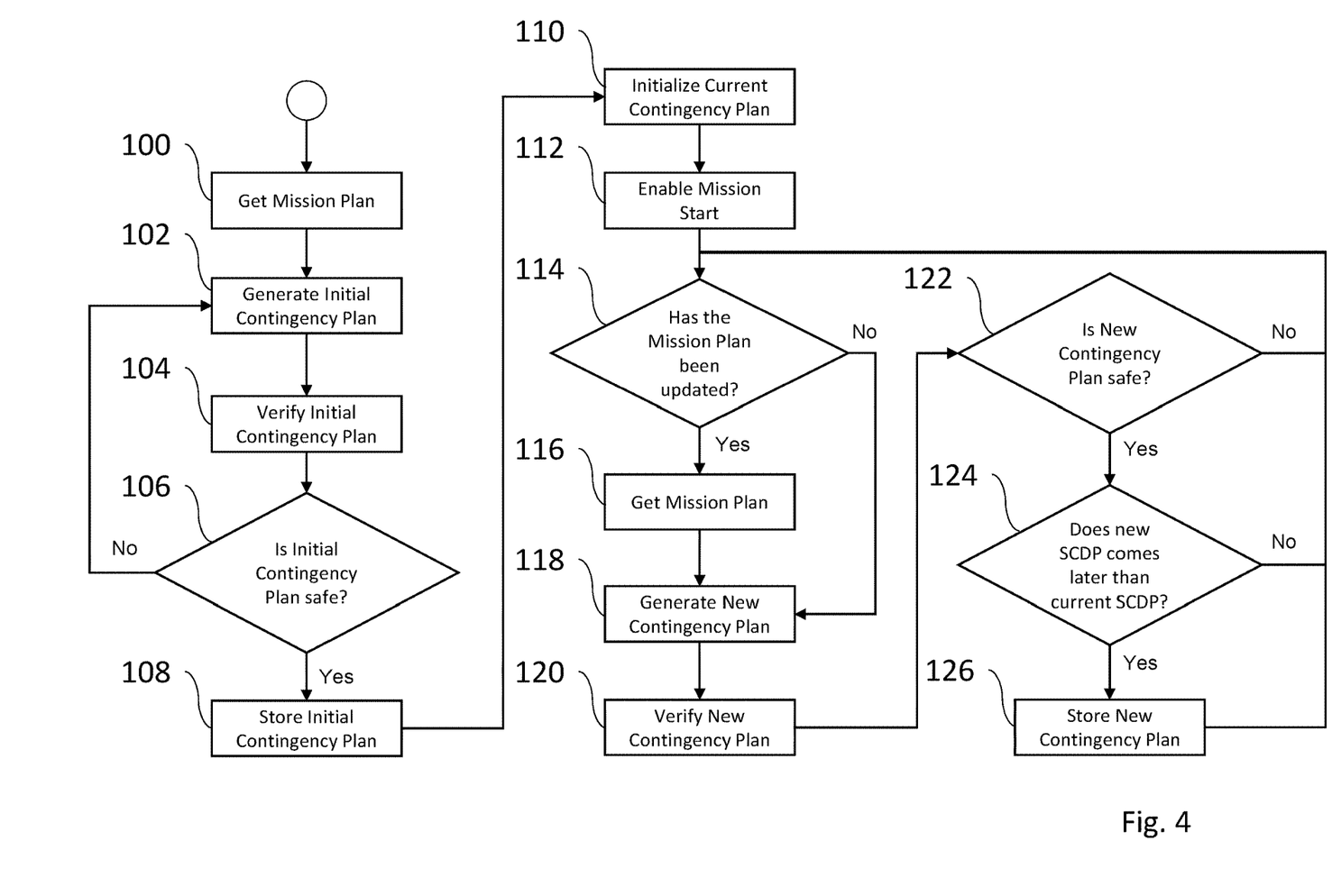
FIG. 4 is a flowchart further illustrating the generation and storage of contingency plans carried out by the run-time assurance module.

As can be seen in the flowchart of FIG. 4, prior to the mission (e.g. before take-off of the aircraft 12) at step 100, the mission planner 4 generates a mission plan (MP) that is verified by the safety monitor 28 based on prior knowledge about the weather conditions, e.g. from a weather forecast or reports from other aircraft in the area. As can be seen in FIG. 3, the MP relates to a journey from an origin airport 32 to a destination airport 34.

Additionally, prior to the mission, an initial contingency plan (ICP) is elaborated by the contingency planner 26 before the mission starts, at step 102. This ICP is verified at step 104 by the safety monitor 28 for safety against weather conditions that are known or expected in advance. As the contingency plan is not required to accomplish the aircraft mission, the ICP is chosen as to minimise uncertainties in its dependability. If the ICP is determined to be safe at step 106, the ICP is stored at step 108 in the switch with memory 30 and is set as the current contingency plan (CCP) at step 110 for later use if needed—this is denoted CCP(1) on FIG. 3. In this particular example, the ICP involves turning back such that the aircraft 12 would turn around and return to the origin airport 32. If the ICP is determined to not be safe at step 106, the process returns to step 102 and a new ICP is generated.

A safety-critical decision point (SCDP) is associated with each contingency plan. Each SCDP is the latest point in space and time along the aircraft mission where the respective contingency plan can be executed with safety guarantees. In the case of the ICP, the associated SCDP 36 is shown on FIG. 3, and is the last point along MP where the ICP can be carried out. If a new contingency plan is not found before the SCDP 36 associated with the ICP is reached, the aircraft 12 will abort the mission and execute the ICP.

After the aircraft takes off and the mission begins at step 112, a check is made at step 114 to determine if the MP has been updated. If so, an updated MP is obtained at step 116.

Once the updated MP is obtained, or if the MP has not been updated, and as the aircraft 12 progresses in its mission (e.g. after take-off at step 112 and during flight), a new contingency plan (NCP) is elaborated by the contingency planner 26 at step 118 in response to prevailing conditions. This NCP is verified by the safety monitor 28 at step 120, which determines at step 122 whether the NCP meets safety requirements, e.g. that the risk level of executing the NCP is sufficiently low (i.e. that the associated flight plan is safe), that it avoids adverse weather, there is sufficient fuel, etc. This safety check includes assessing the risk associated with hazardous weather zones 38a-d. While not shown, the safety check may also check for other hazards such as terrain, buildings, trees, power lines, or other aircraft. While the hazards are represented as 2D ellipses in 38a-d for clarity in this example, it will be appreciated that, in reality, the hazards may be any appropriate 2D, 3D or 4D geometrical shape, whether regular or irregular, including but not limited to polygons, polyhedral, polytopes, spheroids, ellipsoids, voxels, etc., as appropriate.

The safety monitor 28 may also check to ensure the flight plan associated with the NCP is actually feasible, i.e. that the aircraft 12 can actually carry out the appropriate manoeuvres (i.e. that there are no required turns that are too tight, no requirement for too steep a descent etc.).

The NCP has a new contingency target location of an alternate airport 40, and an associated contingency flight plan to direct the aircraft 12 to the alternate airport 40. Like the ICP, this NCP has an associated SCDP 42, which is the last point along MP where the NCP could be carried out by the aircraft 12.

If the safety monitor 28 determines at step 122 that the NCP is safe and determines at step 124 that its associated SCDP 42 comes later in the mission than the SCDP of the CCP, the safety monitor 28 updates the CCP based on the NCP—this is denoted CCP(2) on FIG. 3. In other words, the generated NCP is now stored as the CCP at step 126. If the safety monitor 28 determines that either of these conditions are not met, the process returns to step 114 where a check is made again regarding whether the MP has been updated.

The safety monitor 28 may replace the previous CCP with the NCP immediately, however, in general, the NCP may be stored in the memory 30 but not be selected as the CCP until the SCDP 36 of the CCP (in this case the ICP) is reached. Thus, once the aircraft 12 reaches the SCDP 36 of the CCP, NCP is then selected as the CCP. In other words, the NCP can be stored in a queue or buffer until the SCDP 36 of the CCP is reached by the aircraft 12 and replaced with the NCP then.

Figure 5:
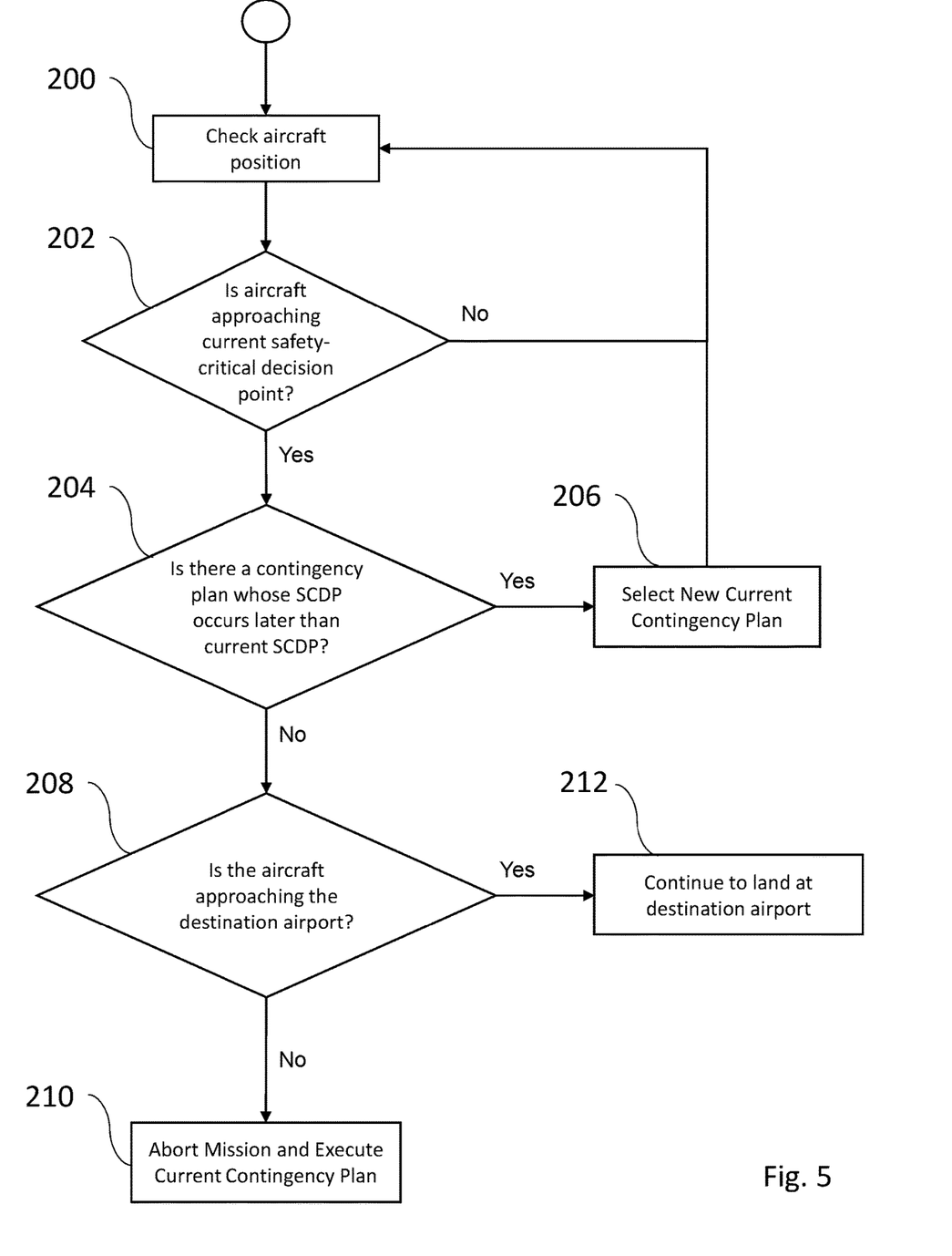
FIG. 5 is a flowchart illustrating operation of the aircraft during run-time.

As can be seen in the flowchart of FIG. 5, throughout the mission, the safety monitor 28 also monitors the aircraft status and determines whether the aircraft has reached the SCDP associated with the CCP, i.e. the position of the aircraft 12 is checked at step 200. A check is made at step 202 as to whether the aircraft 12 is approaching the SCDP. If the aircraft 12 is not approaching the SCDP, the process returns to checking the aircraft position at step 200.

If, on the other hand, the aircraft 12 is approaching the SCDP, a further check is made at step 204 as to whether there is a contingency plan having an SCDP later than the current SCDP, i.e. the process described above in relation to the generation and verification of an NCP is carried out. If a verified-safe contingency plan with a later SCDP is available, it is selected as the CCP at step 206 and the process returns to step 200.

However, if at step 204 it is determined that the aircraft 12 will reach the current SCDP and no safe NCP is available, e.g. due to the upcoming hazardous weather zones 38b-d, an additional check is made to see whether the aircraft 12 is approaching the destination airport at step 208. If the aircraft 12 is not approaching the destination airport 34, the safety monitor 28 disengages the mission planner 4 and engages the autopilot to execute the CCP at step 210. On the other hand, if the aircraft 12 is approaching the destination airport 34, it may be deemed safe enough to proceed to land at the destination airport 34 at step 212.

It should be noted, however, that if the safety monitor 28 had found a viable NCP that was safe, the mission could have continued. Any number of NCPs could be found throughout the mission, as appropriate based on the needs of a given scenario and the frequency at which the system makes assessments regarding these contingency plans. For example, there may be third, fourth, fifth, etc. safe NCPs that are generated and verified such that the mission could be completed. In some scenarios, the remaining MP could be deemed sufficiently safe by the safety monitor 28 that the mission could be completed. However, in the particular scenario shown in FIG. 3, no such assessment is made, and the aircraft diverts to land at the alternate airport 40.

Thus, it will be appreciated by those skilled in the art that examples of the present disclosure provide an improved run-time assurance module that beneficially allows contingency plans to be updated during a mission. Contingency plans generated in response to prevailing, real-time conditions are verified to ensure that they are safe and, if so, are used instead of the earlier contingency plans so long as the safety-critical decision point of the new plan will occur further in the future than the equivalent point in time for the existing contingency plan.

While specific examples of the disclosure have been described in detail, it will be appreciated by those skilled in the art that the examples described in detail are not limiting on the scope of the disclosure.

The invention claimed is:

1. A run-time assurance module comprising:
a contingency planner arranged to generate an initial contingency plan having an associated safety-critical decision point, wherein said initial contingency plan is stored as a current contingency plan in a memory;
said run-time assurance module being arranged such that:
the run-time assurance module receives a mission plan from a mission planner;
when the mission plan is being carried out, the contingency planner processes at least one condition input, and generates a new contingency plan based on condition input, said new contingency plan having an associated safety-critical decision point;
when the new contingency plan satisfies a safety criterion and the safety-critical decision point associated with the new contingency plan will occur later in time than the safety-critical decision point associated with the current contingency plan, the new contingency plan is stored in the memory, wherein the run-time assurance module is arranged to select the new contingency plan as the current contingency plan; and
when the mission plan is being carried out, if the safety-critical decision point associated with the current contingency plan is reached and there is no further safe contingency plan in the memory, an autopilot function is engaged such that the current contingency plan is executed.

2. The run-time assurance module of claim 1, arranged to select the new contingency plan as the current contingency plan only once the safety-critical decision point of the current contingency plan is reached.

3. The run-time assurance module of claim 1, wherein the mission plan comprises a mission target location and a mission flight path, and wherein each contingency plan comprises a respective contingency target location and a respective contingency flight path.

4. The run-time assurance module of claim 1, further comprising a safety monitor arranged to receive the new contingency plan from the contingency planner, wherein the safety monitor is arranged to determine when the new contingency plan satisfies the safety criterion.

5. The run-time assurance module of claim 4, wherein the safety monitor is arranged to receive the at least one condition input and use the condition input or inputs when determining whether the contingency plan satisfies the safety criterion.

6. The run-time assurance module of claim 4, wherein the safety monitor is arranged to receive the mission plan from the mission planner and to verify that the mission plan satisfies the safety criterion.

7. The run-time assurance module of claim 1, arranged to determine whether the new contingency plan is flyable, wherein the new contingency plan is stored as the current contingency plan only when said new contingency plan is flyable.

8. The run-time assurance module of claim 1, arranged to generate a plurality of contingency plans for the condition input and to store the plurality of contingency plans in the memory as a contingency plan library, wherein each of the contingency plans has an associated safety-critical decision point.

9. The run-time assurance module of claim 1, comprising a switch arranged to switch an output plan between the mission plan and the current contingency plan.

10. The run-time assurance module of claim 1, arranged to receive a condition input from at least one sensor, optionally wherein the at least one sensor comprises at least one sensor from a group comprising: an on-board weather radar; a temperature sensor; a humidity sensor; a pressure sensor; a speed sensor; a proximity sensor; an accelerometer; and a gyroscope.

11. The run-time assurance module of claim 1, arranged to receive the condition input from a communications module.

12. The run-time assurance module of claim 1, arranged to receive the condition input from a vehicle management system.

13. The run-time assurance module of claim 1, comprising a switching unit that comprises the memory, the switching unit being arranged to switch between the contingency plans to select one of them as the current contingency plan suitable for output from the run-time assurance module.

14. A method of mission planning for an aerospace application, the method comprising:
- generating or receiving a mission plan;
- generating an initial contingency plan having an associated safety-critical decision point;
- storing the initial contingency plan as a current contingency plan in a memory;
- carrying out the mission plan;
- when the mission plan is being carried out, processing at least one condition input, and generating a new contingency plan based on said condition input, said new contingency plan having an associated safety-critical decision point;
- when the new contingency plan satisfies a safety criterion and the safety-critical decision point associated with the new contingency plan will occur later in time than the safety-critical decision point associated with the current contingency plan, storing the new contingency plan;
- selecting the new contingency plan as the current contingency plan; and
- when the mission plan is being carried out, if the safety-critical decision point associated with the current contingency plan is reached and there is no further safe contingency plan in the memory, engaging an autopilot function such that the current contingency plan is executed.

15. A non-transitory computer-readable medium comprising instructions that, when executed by a processor, cause the processor to carry out a method of mission planning for an aerospace application, the method comprising:
- generating or receiving a mission plan;
- generating an initial contingency plan having an associated safety-critical decision point;
- storing the initial contingency plan as a current contingency plan in a memory;
- carrying out the mission plan;
- when the mission plan is being carried out, processing at least one condition input, and generating a new contingency plan based on said condition input, said new contingency plan having an associated safety-critical decision point;
- when the new contingency plan satisfies a safety criterion and the safety-critical decision point associated with the new contingency plan will occur later in time than the safety-critical decision point associated with the current contingency plan, storing the new contingency plan;
- selecting the new contingency plan as the current contingency plan; and
- when the mission plan is being carried out, if the safety-critical decision point associated with the current contingency plan is reached and there is no further safe contingency plan in the memory, engaging an autopilot function such that the current contingency plan is executed.

* * * * *